Jan. 9, 1934.     A. M. HENRY     1,942,423
EDIBLE ARTICLE
Filed June 17, 1931     2 Sheets-Sheet 1
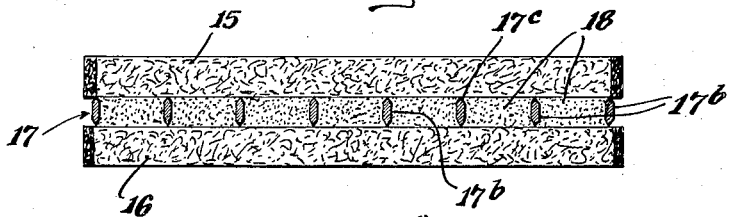
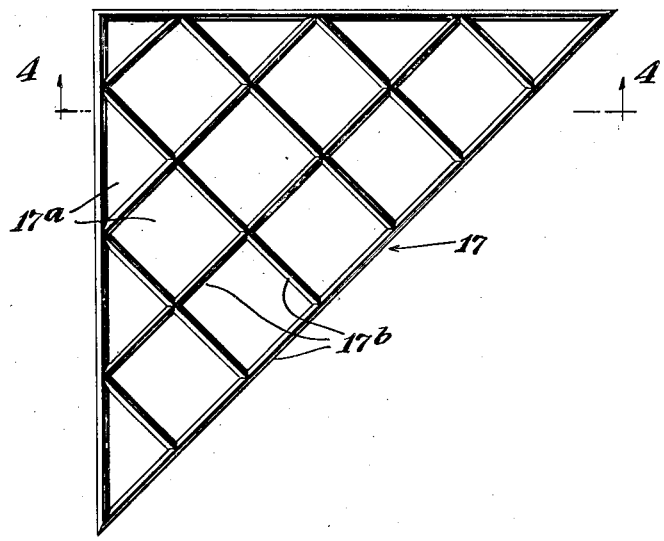
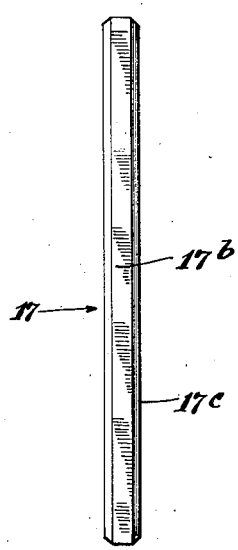
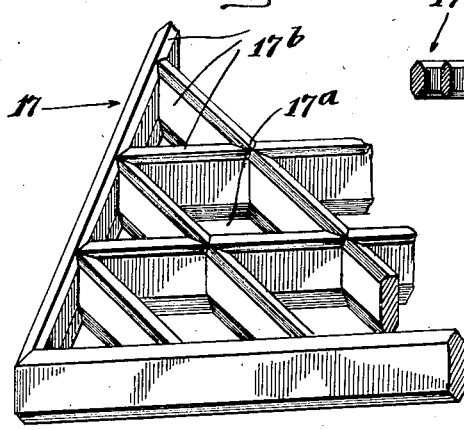
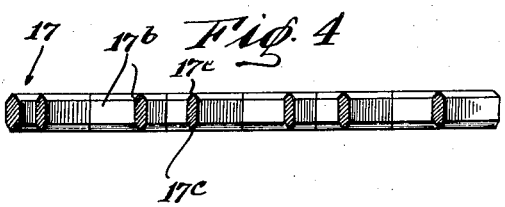
INVENTOR Jan. 9, 1934.  A. M. HENRY  1,942,423
EDIBLE ARTICLE
Filed June 17, 1931  2 Sheets-Sheet 2

INVENTOR
Augustus M. Henry

Patented Jan. 9, 1934

1,942,423

UNITED STATES PATENT OFFICE 1,942,423

EDIBLE ARTICLE

Augustus M. Henry, Brooklyn, N. Y.

Application June 17, 1931. Serial No. 544,969

1 Claim. (Cl. 99—11)

This invention relates to food products, and more particularly to a food product such as a sandwich. The invention has been made especially with the idea of providing a novel and improved sandwich, of the type wherein the filling material between a plurality of bread slices or the like is jelly-like or otherwise relatively fluent, yet a sandwich which may be handled freely without messiness at the edges and bitten into by the consumer without undesirable displacement of the filling material across the sandwich.

A favorite type of sliced-bread sandwich is one made up of two or more bread slices, and one or more layers of filling material consisting of or including jam, cream cheese, crushed olives, chopped eggs or a similar jelly-like or relatively fluent material. Often, also, the bread slices of this type of sandwich are toasted; the crunchiness of the toast pieces bitten off, and chewed with, portions of the filling material, in the presence of the jelly-like or relatively fluent character of the latter, enhancing considerably the gustatory appeal. However, even when the bread slices or the like are not toasted, the eating of a sliced-bread sandwich in public is seldom possible without embarrassment or disquietude. The fluent material is compressed at the location of each bite; and if the bread be not unusually soft and the fluent material be not unusually viscous or previously spread to an undesirably thin layer, even the first bite, ordinarily, will include less of the filling material than was located at the situs of this bite when the sandwich was made up. Succeeding bites, in consuming the sandwich by biting into the same from a starting point at an edge thereof and thence across the sandwich, will each include less and less of the intended proportion of the filling material. At the same time, the filling material is moved or flowed across the sandwich, first to bulge beyond edge portions thereof and soil the fingers, and next to drop clear and perhaps soil the clothing. When the bread slices are toasted, these disadvantages are aggravated.

One object of the invention is to provide a sandwich so made as to avoid the disadvantages explained; another object is to provide a novel filler from which an improved sandwich may be made; and a further object is to provide, as an article of manufacture, a filler element or device adapted to form part of such novel filler.

In the preferred embodiments of the invention illustrated in the accompanying drawings, the new sandwich is in the form of a pair of bread slices, wafers or the like, having between them a filler layer which includes, as the filler proper, a mass of fluent material, with various subdivisions of this mass locally restrained against unintended movement across the sandwich. This restraint is desirably effected by providing a filler element or device, in the shape of a skeletonized structure of edible material to be consumed with and as a part of the sandwich. Such skeletonized structure is most desirably formed and arranged to provide a plurality of walls or partitions between which are established a plurality of pockets or recesses for the jelly-like, creamy, broken-up or otherwise relatively fluent, or potentially fluent, filler proper. According to the invention, various subdivisions or portions of the filler proper are completely or partially enclosed by said walls or partitions, and at the same time the latter are adapted to act as spacers between the bread slices, wafers or the like.

A full understanding of the invention can best be given by a detailed description of preferred embodiments thereof, and such a description will now be given in connection with the accompanying drawings, in which:

Fig. 1 shows one form of sliced-bread sandwich, in vertical section.

Fig. 2 is a plan view of a form of filler device two of which are suitable for use in making up a sandwich cut diagonally to provide two triangular sandwich halves.

Fig. 3 is a view of said device in side elevation, looking toward the left in Fig. 2.

Fig. 4 is a transverse section, taken on the line 4—4 of Fig. 2.

Fig. 5 is a fragmentary perspective view on an enlarged scale showing details of said device more clearly.

Figure 6:
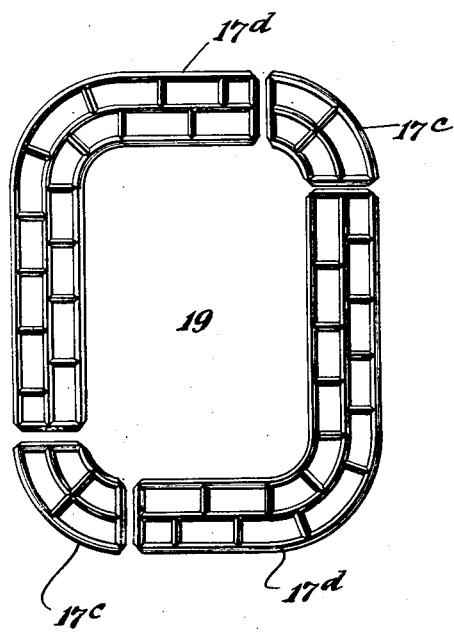
Fig. 6 is a top plan view showing a modified form of filler device made up of a number of separate filler devices of different sizes and shapes.

The embodiment of the invention illustrated in Figs. 1 and 5 will first be described. The sandwich includes an upper bread slice 15, and a lower bread slice 16. If these slices are to be toasted, they are toasted before making up the sandwich, as usual. The filler placed between these slices includes a grid-like skeletonized filler structure or device 17, and a filler proper 18 including the fluent or broken-up material or materials selected. This filler proper is subdivided or separated into different portions, each of such portions being placed in one of the pockets or recesses 17a. The shapes of the pockets or recesses, and the arrangements of the walls or partitions, are unimportant; it being desirable, however, to have the pockets or recesses of such size that a bite through the sandwich and the consequent removal of a part thereof will not leave the thereby opened-up portion or portions of the filler proper too much unrestrained. The portions of the filler device 17 removed with each bite are chewed and swallowed with the rest of the sandwich parts bitten off; such device 17 being of edible material. It is recommended that the device 17 be baked from a suitable dough and then fried in melted fat to add crispness, and at the same time retain sufficient crushing strength to permit the walls or partitions 17a to act as spacers between the bread slices, especially when the latter are toasted. Any suitable edible material may be used in making a filler device. Preferably the same is either bread-like or negative in taste. It is preferred, also, to shape the walls or partitions 17b, as shown, so that they present beveled or sharpened edges, as indicated at 17c, to assist in preventing shift of the filler device across the sandwich. As seen in Fig. 2, the filler device 17 is triangular. It may, of course, have any outline. The sandwich illustrated in Figs. 1 to 5 is assumed to be made of slices of bread cut from a loaf such as the common white loaf substantially rectangular in cross-section and of rather large cross-sectional area; which sandwich is usually diagonally cut into two triangular halves before being served. In making up such a sandwich, two of the triangular filler devices 17 are used; arranged between the slices 15 and 16 completely to cover same either before or after the diagonal cut.

Figure 7:
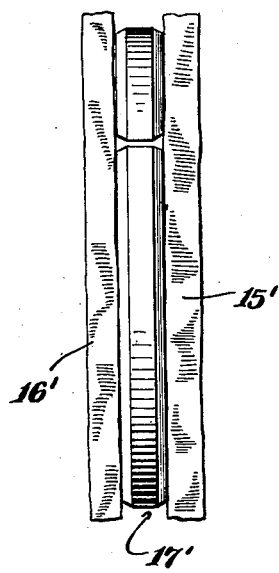
Fig. 7 is a view in edge elevation showing a sliced-bread sandwich having a filler including the filler structure of Fig. 6; as, for instance, a sliced-bread sandwich the bread slices of which are cut from a rye loaf oblongovate in cross-section.

Figs. 6 and 7 illustrate a sandwich made up by arranging between bread slices 15' and 16', a filler structure 17' which includes a plurality of differently shaped filler devices as indicated at 17c and 17d, each having walls or partitions to present a number of pockets or recesses for having placed therein subdivisions of the fluent or broken-up filler proper. The filler devices 17c and 17d, it will be noted, are rounded, so that a substantially continuous filler structure may be built up along the marginal portions of an oblongovate sandwich such as would be made up were the slices 15' and 16' cut from an ordinary rye loaf. If it be desired to employ filler devices similar to the devices 17c and 17d, and also to have subdivisions of the filler proper pocketed all across the sandwich, the filler structure of Fig. 6 may be further built up by arranging within area 19 as desired one or more auxiliary filler devices (not shown) specially shaped or broken off from the extended sheet 17'' of Fig. 8.

Figure 8:
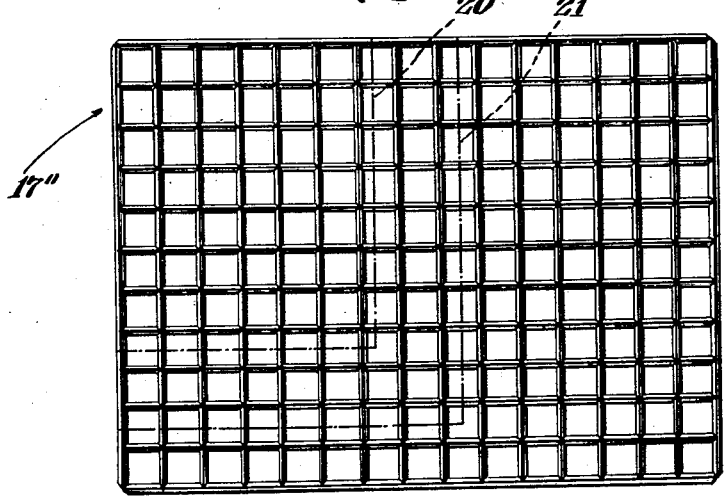
Fig. 8 is in full-lines a plan view of a filler device made as an extended sheet, for subsequent cutting up or breaking off to provide one or more pieces therof for use in making a sliced-bread sandwich of any desired size or shape.

Referring to Fig. 8, the extended sheet shown at 17'' may be made as large as desired, and cut or broken up as required for sandwiches of different sizes; for instance as indicated by the dot and dash lines 20 and 21.

The invention is applicable not only to sandwiches wherein the filler proper is fluent normally but also to sandwiches wherein the filler proper is potentially fluent, as for instance ice-cream.

Though I have shown and described certain approved arrangements and combinations I do not wish to be limited thereto, as numerous changes may be made. In the claim following, pointing out the scope of protection contemplated, the word "fluent" is used in the sense of "potentially fluent" also.

What is claimed is:

A sandwich including, in combination, an upper edible sheet structure defining the expanse of the sandwich, a lower edible sheet structure of similar shape, each of said structures having a face of rough texture, and an interposed edible sheet structure having spaced and joined walls providing a plurality of clear-through compartments closed all around by said walls, said walls having their end edges applied to said faces of the two sheet structures first mentioned to close said compartments at their opposite ends and at the same time to coact with the rough texture of said faces to combat shifting of any of said sheet structures relative to another, there being placed in said compartments separate masses of a fluent edible material.

AUGUSTUS M. HENRY.